(12) United States Patent
Heistand, II et al.

(10) Patent No.: US 7,054,144 B2
(45) Date of Patent: May 30, 2006

(54) MODULAR ENCLOSURE LOCKING BEZEL AND METHOD OF USE

(75) Inventors: Raymond D. Heistand, II, Round Rock, TX (US); Anthony W. Cuteri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 144 days.

(21) Appl. No.: 10/444,157

(22) Filed: May 23, 2003

(65) Prior Publication Data

US 2004/0233619 A1 Nov. 25, 2004

(51) Int. Cl.
*H05K 5/00* (2006.01)
(52) U.S. Cl. ............. 361/679; 361/725; 312/223.1
(58) Field of Classification Search ........... 361/685, 361/724–727, 679; 312/223.1–223.3
See application file for complete search history.

(56) References Cited

U.S. PATENT DOCUMENTS

| 5,119,270 | A | * | 6/1992 | Bolton et al. ............... 361/687 |
|---|---|---|---|---|
| 5,397,176 | A | | 3/1995 | Allen et al. ............... 312/223.2 |
| 5,505,533 | A | * | 4/1996 | Kammersgard et al. .... 312/236 |
| 6,052,278 | A | | 4/2000 | Tanzer et al. ............... 361/685 |
| 6,116,063 | A | | 9/2000 | Foslien ........................ 70/58 |
| 6,134,116 | A | | 10/2000 | Hoss et al. ................. 361/747 |
| 6,246,572 | B1 | | 6/2001 | Myers et al. ............... 361/683 |
| 6,259,605 | B1 | | 7/2001 | Schmitt ....................... 361/727 |
| 6,272,721 | B1 | | 8/2001 | Gardner et al. ............... 24/295 |
| 6,494,070 | B1 | | 12/2002 | Moss et al. ................... 70/423 |
| 2003/0030990 | A1 | * | 2/2003 | King et al. |

* cited by examiner

*Primary Examiner*—Yean-Hsi Chang
(74) *Attorney, Agent, or Firm*—Baker Botts L.L.P.

(57) ABSTRACT

An information handling system with a chassis for housing a modular information includes a front face with one or more front openings. The front face includes a first pull handle located on one end of the front face and the second pull handle located on a second end of the front face. A locking bezel is provided that includes a first end with a retaining shoulder and a second end with a locking shoulder assembly. The retaining shoulder is formed to interface with the first pull handle and the locking shoulder assembly is formed to selectively lock the locking bezel to the second pull handle.

17 Claims, 4 Drawing Sheets

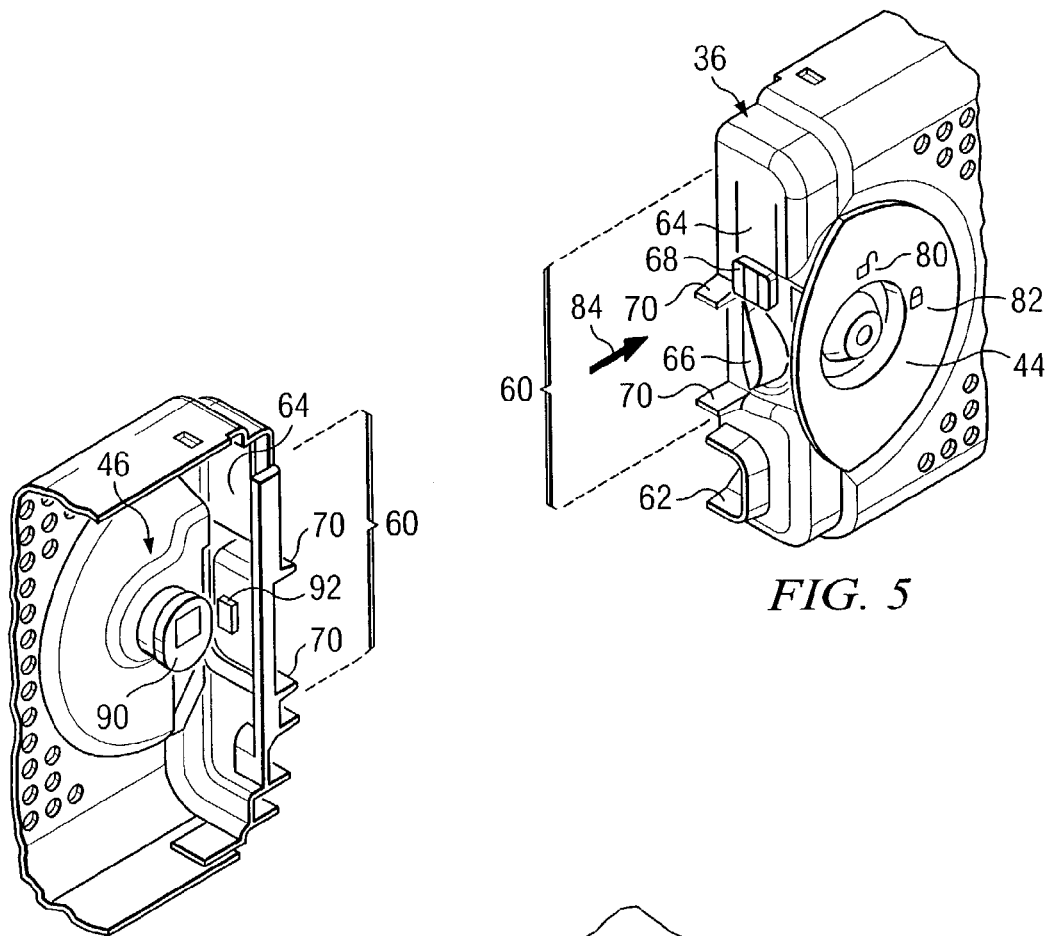
FIG. 5
FIG. 6
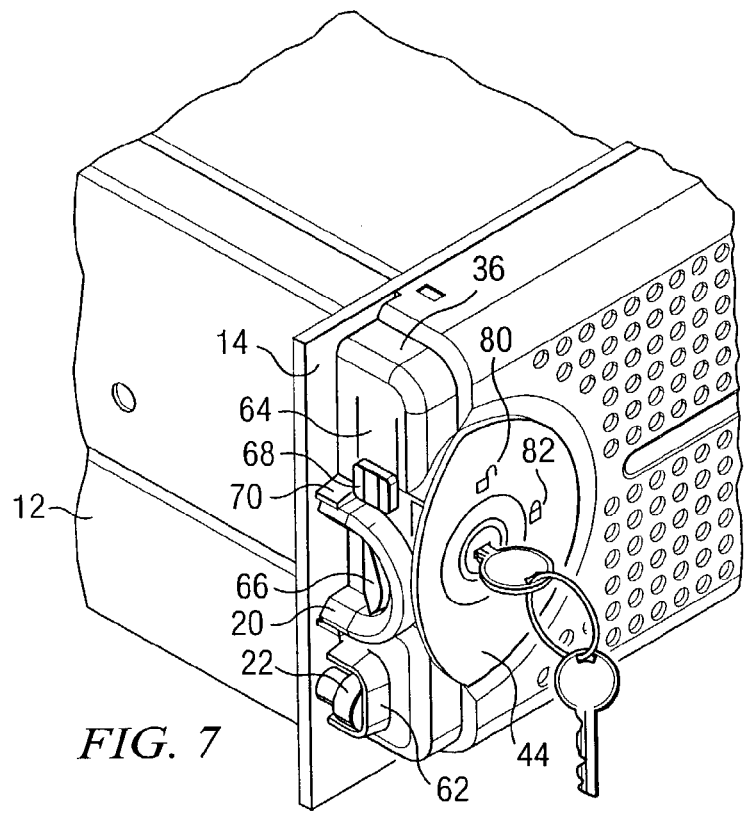
FIG. 7

MODULAR ENCLOSURE LOCKING BEZEL AND METHOD OF USE

TECHNICAL FIELD

The present disclosure relates in general to computer systems and more specifically to a locking bezel for a modular enclosure system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system is a modular information handling system which may also be referred to as a blade server, a brick server, a modular enclosure, or a modular storage system. Modular information handling systems typically contain a midplane for interconnecting multiple modular components such as modular driver carriers or blades. The midplane and modular components are typically stored in a chassis with a front opening that allows for easy installation and removal of the modular components minimizing the installation and removal operations. Many modular information handling systems allow modular components to be installed or removed while the system is operating which is often referred to as a "hot-swap."

Currently, because modular components may be easily removed, systems are typically unsecured and at risk for the unauthorized removal of one or more of the modular components from the chassis. In current systems the protection of the modular components from unauthorized removal is often limited to locking the door of the rack in which the chassis is typically mounted. However, not all racks include a locking panel and locking the rack restricts access unnecessarily.

Some modular information handling systems provide a locking bezel, however current locking bezels typically require additional components to be installed on the chassis such as a locking flange for locking the bezel to the chassis.

SUMMARY

Therefore a need has arisen for a system and method for preventing the unauthorized removal of modular components from a modular information handling system without requiring substantial reconfiguration of the chassis.

Therefore a further need has arisen for a system and method for allowing for selective access to install and remove drive carriers from a drive storage enclosure stored in a rack system while maintaining proper security.

In accordance with teachings of the present disclosure, an information handling system utilizing a locking bezel for selectively restricting access to a front opening of a modular information handling system chassis is described that overcomes or eliminates problems associated with existing modular information handling systems.

In one aspect, an information handling system includes a chassis for housing a modular information system is described. The chassis includes a front face with one or more front openings. The front face also has a first pull handle located on one end of the front face and the second pull handle located on a second end of the front face. A locking bezel is provided that includes a first end with a retaining shoulder and a second end with a locking shoulder assembly. The retaining shoulder is formed to interface with the first pull handle and the locking shoulder assembly is formed to selectively lock the locking bezel to the second pull handle.

In another aspect, a locking bezel is disclosed that includes a bezel body with a first end and a second end. A retaining shoulder is formed on the first end and is sized to engage a pull handle of a chassis. The bezel body also includes a locking shoulder assembly on its second end that includes a locking shoulder formed on a locking lever that is movable between a locked position and a release position. The locking shoulder assembly is formed to selectively secure the locking shoulder to a second pull handle of the chassis.

In yet another aspect, a method of securing a bezel to a modular information handling system is disclosed. The method includes providing a locking bezel with a bezel body that has a first end and a second end. The first end of the bezel body includes a retaining shoulder; the second end of the bezel body includes a locking shoulder assembly. The method further includes aligning the retaining shoulder with a first pull handle of a chassis and then inserting the retaining shoulder into the first pull handle. Next the locking shoulder assembly is positioned in a release position and aligned with the second pull handle. Next the locking shoulder assembly is positioned in the locked position thereby inserting the locking shoulder into the second pull handle, thereby securing the locking bezel to the chassis.

The present disclosure includes a number of important technical advantages. One important technical advantage is providing a locking bezel that attaches to the front face of a chassis without requiring the installation of additional components. The locking bezel allows access to the front of the chassis to be restricted, thereby preventing the unauthorized removal of modular components stored therein, without requiring additional components. The retaining shoulder and the locking shoulder assembly allow the bezel to be easily installed onto a modular information handling system front face to restrict access to modular components thereby allowing for selective access to install or remove modular components such as drive carriers. Further advantages of the present disclosure are described in the description, figures, and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 5 is an isometric view of a second end of a locking bezel;

FIG. 6 is a back-side view of the second end of the locking bezel; and

FIG. 7 is an isometric view of a locking bezel installed on a modular information handling system chassis, with portions cut away.

DETAILED DESCRIPTION

Preferred embodiments and their advantages are best understood by reference to FIGS. 1 through 6, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present embodiment discloses a locking bezel that attaches directly through the chassis protecting all modular components from unauthorized removal.

Figure 1:
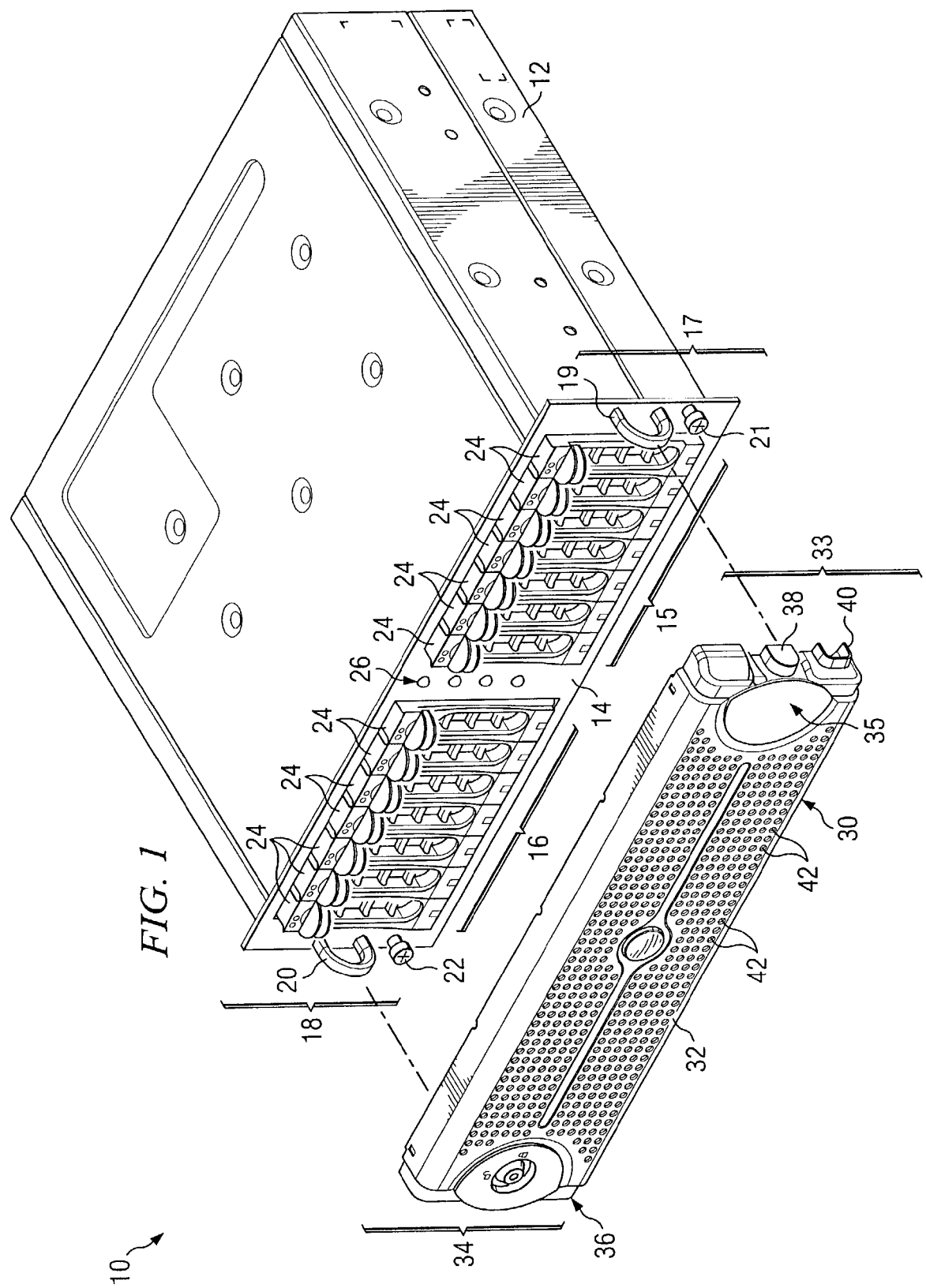
FIG. 1 is a perspective view of a modular information handling system chassis and a locking bezel according to teachings of the present disclosure.

Now referring to FIG. 1, an information handling system, depicted generally at 10, is shown. Information handling system 10 may be a modular storage system which may be referred to as an enclosure or a storage enclosure, or a modular server which may also be referred to as a brick server or a blade server. Information handling system 10 is stored in a housing such as chassis 12. In the present embodiment, information handling system 10 includes a midplane (not expressly shown) within chassis 12 for connecting with multiple modular components 24.

Chassis 12 has a front face having a face plate 14, a first end 17 and a second end 18. Face plate 14 includes first opening 15 and second opening 16 for installing and removing modular components 24. In alternative embodiments, face plate 14 may include one single opening or multiple openings. In the present embodiment, face plate 14 is attached to the front surface, which may also be referred to herein as the front face, of chassis 12. In alternate embodiments, face plate 14 may be incorporated into the construction of face plate 14 instead of being provided as a separate component. Face plate 14 includes two openings 15 and 16 for accessing modular components. In the present embodiment, face plate 14 further includes an indicator panel 26 disposed between first opening 15 and second opening 16. Indicator panel 26 includes status indicators for identifying the condition of system 10 or modular components 24. In an alternate embodiment, a face plate may be utilized that does not include an indicator panel 26. In additional alternate embodiments, an alternate face plate may be utilized that includes only a single opening for accessing modular components.

First pull handle 19 and second pull handle 20 extend outward from first end 17 and second end 18. In the present embodiment first pull handle 19 and second pull handle 20 are D-shaped pull handles that extend generally perpendicular out from face plate 14 and also have a generally vertical disposition.

Face plate 14 attaches to the front of chassis 12 and overlaps the sides thereof. The overlapping portions of face plate 14 are sufficient to contact the inner face portions of the rack rails of racks in which information handling system 10 may be installed. Accordingly, the overlapping portions of face plate 14 facilitate the installation of chassis 12 into racks such as racks compliant with Electronic Industry Association (EIA) standards such as standard EIA-310.

Face plate 14 also includes first fastener 21 and second fastener 22. First fastener 21 and second fastener 22 are both provided on the extended portions of front face 42 and are placed to allow information handling system 10 to be secured to a rack system. In the present embodiment, fasteners 21 and 22 are both thumbscrews provided on the extended portions of the first end 17 and second end 18, respectively and are sized to allow fasteners 21 and 22 to be screwed into standard interfaces provided for EIA-310 compliant equipment storage racks.

Face plate 14 also includes status indicator panel 26. Status indicator panel 26 is operatively connected with information handling system 10 and provides multiple status indicators where each indicator may signal a particular condition of information handling system 10.

In the present embodiment, fourteen modular components 24 are installed within information handling system 10. Modular components 24 may be any suitable modular components such as drive carriers or blade servers. In the present embodiment, modular components 24 are drive carriers. Each modular component 24 is preferably installed in information handling system 10 by disposing each component within either first opening 15 or second opening 16. Modular components 24 may further be installed or removed while information handling system 10 is operating.

Locking bezel 30 includes bezel body 32 having a first end 33 and a second end 34. In the present embodiment locking bezel 30 includes a first end cap 35 installed on the first end 33 of bezel body 32 and a second end cap 36 installed on the second end 34 of bezel body 32. Bezel body 32 is preferably constructed of metal and, in the present embodiment first end cap 35 and second end cap 36 have a plastic molded construction material. In an alternate embodiment, end caps 35 and 36 may be incorporated into the construction of bezel body 32.

Bezel body 32 includes a pattern of perforations 42 to allow airflow into information handling system 10 through bezel body 32. Air flow through perforations 42 facilitates cooling of information handling system 10.

End cap 35 includes retaining shoulder 38 and fastener cap 40. In the present embodiment retaining shoulder 38 has a raised D-shape extending from the side surface of end cap 35. The D-shape of retaining shoulder 38 is sized to fit within the interior portion of first pull handle 19. In alternate embodiments the shape of retaining shoulder 38 may preferably be selected according to the size and configuration of the interior portion of an alternate pull handle extending from face plate 14. Alternate configurations of pull handles 19 and 20 involve, but are not limited to, rectangular and semi-circular configurations.

Fastener cap 40 is incorporated into first end cap 35 and positioned to cover fastener 21 when bezel 30 is installed. Fastener cap 40 is sized to cover and restrict physical access to the thumbscrew 21. Fastener cap 40 may also be referred to as a thumbscrew cap. In operation, when locking bezel 30 is installed, fastener cap 40 covers fastener 21 and prevents access thereto. Preventing access to fastener 21 ensures that information handling system 10 cannot be removed from its rack by removing fasteners 21 and 22 and then removing system 10 from its rack. Second end cap 36 includes keyed lock assembly 44 described in more detail with respect to FIG. 5 below.

The overall design of locking bezel 30 preferably allows locking bezel 30 to be installed on an existing storage enclosure without the addition of any new elements or components for mounting.

Figure 2:
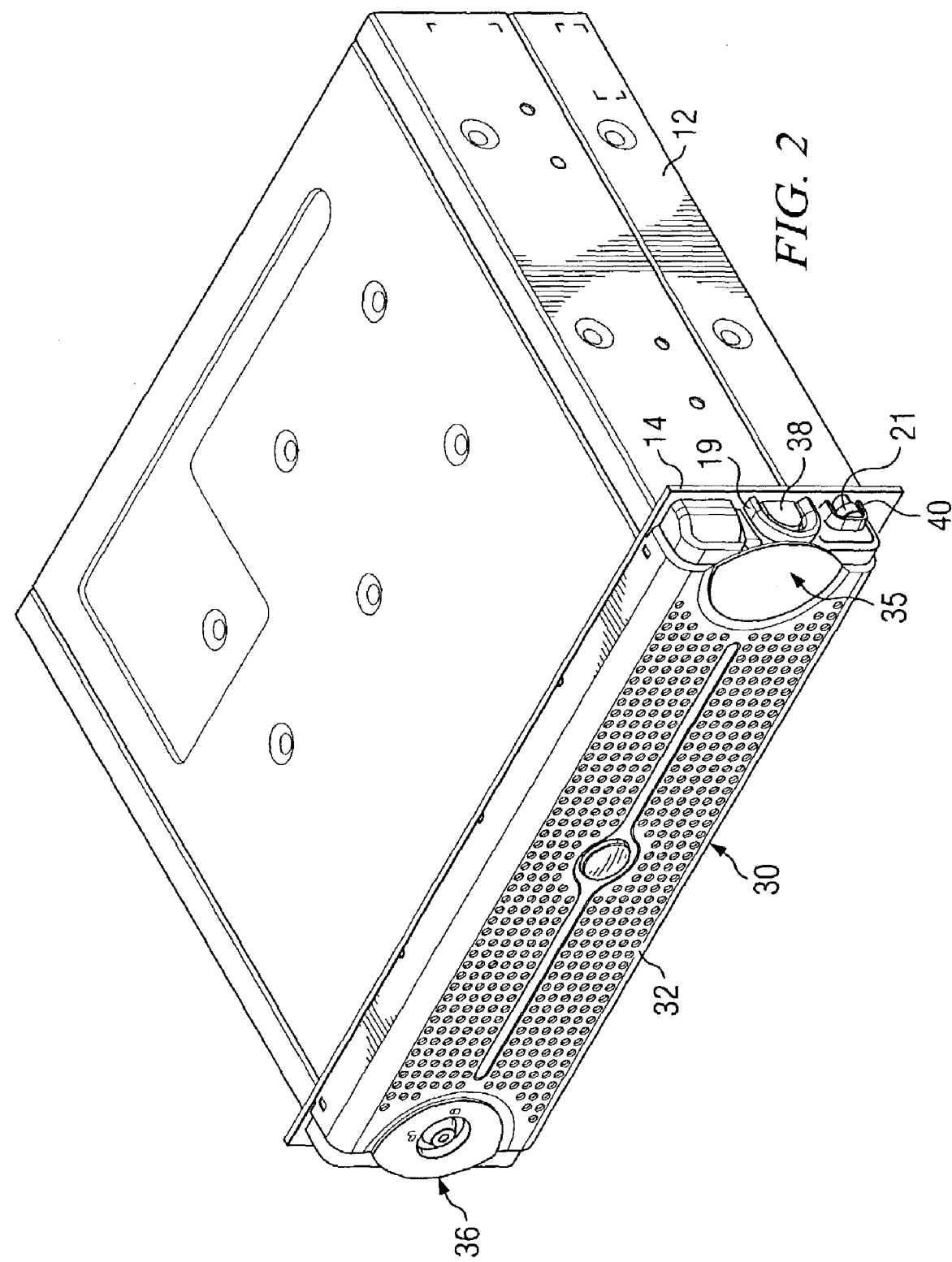
FIG. 2 is a perspective view of a locking bezel installed on the front face of a modular information handling system chassis.

Now referring to FIG. 2, a perspective view showing locking bezel 30 installed onto face plate 14 of chassis 12 is shown. FIG. 2 also shows the engagement of retaining shoulder 38 with pull handle 19. In the present embodiment in which locking bezel 30 is installed onto face plate 14 retaining shoulder 38 is inserted into the interior of pull handle 19. Additionally, fastener cap 40 is disposed over fastener 21 such that access to fastener 21 is restricted. In the present embodiment locking bezel 30 is preferably sized for chassis 12 designed to fit into a 3U rack space. Locking bezel 30 is sized to attach to face plate 14 while still allowing system 10 to fit into a 3U rack envelope.

Figure 3:
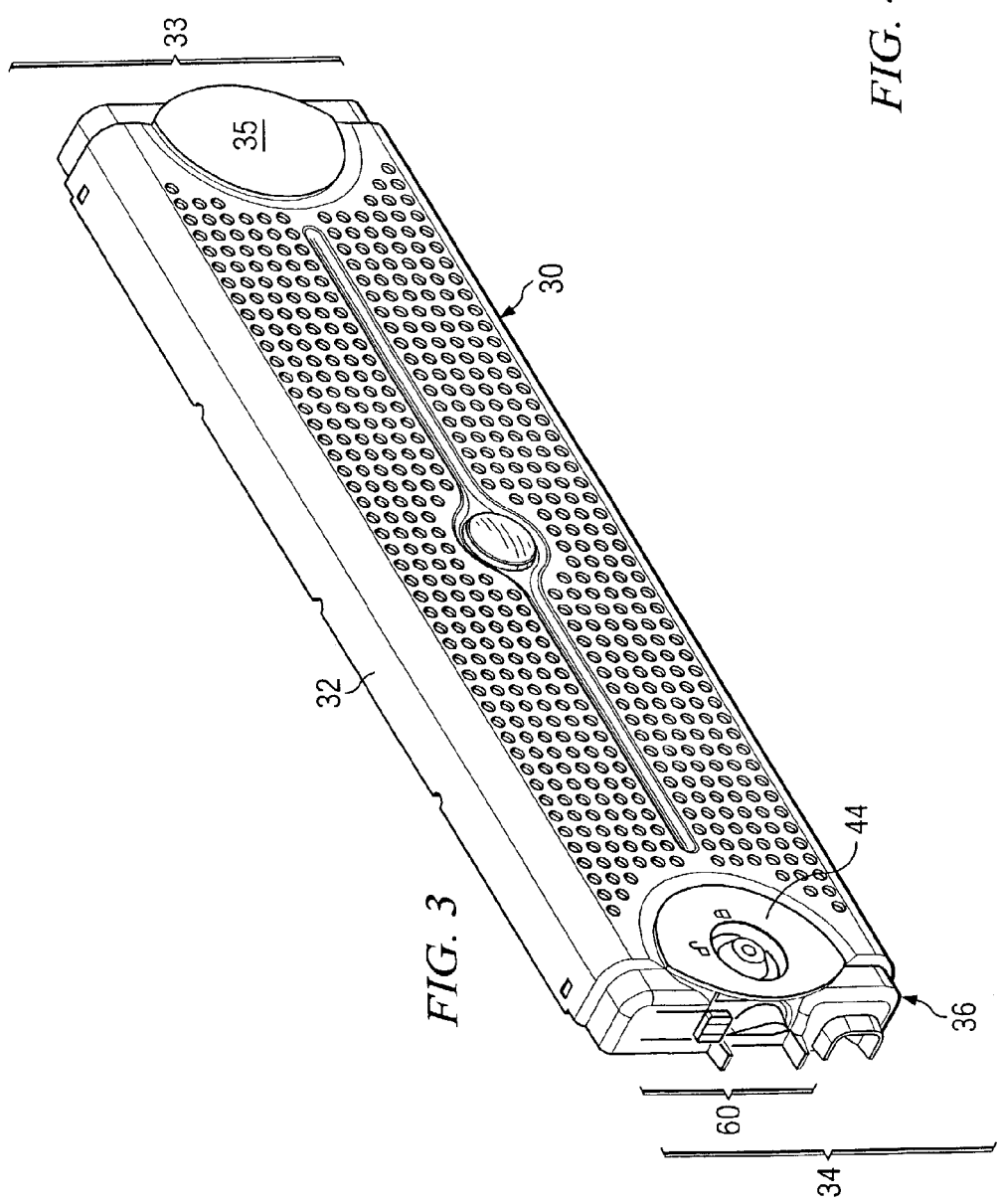
FIG. 3 is a perspective view of a locking bezel according to teachings of the present disclosure.

Now referring to FIG. 3, a perspective view of locking bezel 30 is shown. Locking bezel 30 includes bezel body 32 having first end 33 and second end 34. First end cap 35 is installed on first end 33 and second end cap 36 is installed on second end 34. Second end cap 36 includes a side face with a locking shoulder assembly 60 formed thereon. Locking shoulder assembly 60 is further described with respect to FIG. 5 below. Second end cap 36 also includes keyed lock assembly 44 for selectively locking the locking shoulder assembly 60.

Figure 4:
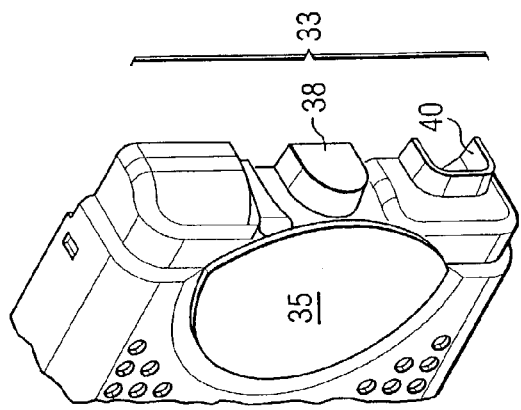
FIG. 4 is an isometric view of a first end of a locking bezel.

Now referring to FIG. 4, an enlarged view of first end 33 of locking bezel 30 is shown. First end 33 includes end cap 35. End cap 35 includes retaining shoulder 38 and fastener cover 40 as described above.

Now referring to FIG. 5, an enlarged view of second end 34 is shown. Second end 34 includes second end cap 36 including locking shoulder assembly 60. Locking shoulder assembly 60 includes locking lever 64 having release tab 68 and locking shoulder 66 disposed thereon. Locking lever 64 is preferably movable between a locked position as shown and a release position in the direction of arrow 84. Locking shoulder 66 is formed to interact with an engaged second pull handle 20 extending from face plate 14 of chassis 12. In the present embodiment, locking shoulder 66 has a ramped or angled profile. As locking shoulder 66 contacts pull handle 20, the ramped profile of locking shoulder 66 is formed to automatically encourage locking shoulder 66 to move in the direction of arrow 84.

Release button 68 is disposed on locking lever 64 and allows the user to move locking lever 64 into a release position in the direction of arrow 84. In the present embodiment locking shoulder assembly 60 also includes alignment tabs 70 which protrude outward from the side face of second end cap 36. Alignment tabs 70 aid in the installation of locking shoulder assembly 60 onto second pull handle 20. In the present embodiment, alignment tabs 70 are vertically spaced to correspond to the height of pull handle 20.

Fastener cap 62 is incorporated into second end cap 36 and positioned to cover fastener 22 when bezel 30 is installed. Fastener cap 62 is sized to cover and restrict physical access to the thumbscrew 22. Fastener cap 62 may also be referred to as a thumbscrew cap. In operation, when locking bezel 30 is installed, fastener cap 62 covers fastener 22 and prevents access thereto.

End cap 36 also includes keyed lock assembly 44. In the present embodiment keyed lock assembly 44 is moveable between a first or locked position 82 and a second or unlocked position 80 via a keyed interface. In first position 82 locking shoulder assembly 60 is free to move between locked position as shown and released position as described above (and thereby able to be freely installed on or removed from the face plate 14 of chassis 12). In second position 80 keyed lock assembly 44 prevents locking shoulder assembly 60 from being moved into the release position in the direction of arrow 84. The operation and components of keyed lock assembly 44 are further described with respect to FIG. 6, below.

Now referring to FIG. 6, a backside view of second end cap 36 is shown. Keyed lock assembly 44 includes locking pawl 90. As shown in FIG. 6, locking pawl 90 is in second position 80 such that locking assembly 60 may freely move between the locked position and the release position. As keyed lock assembly 44 is turned to first position 82, locking pawl 90 rotates and makes contact with strike pad 92 disposed on locking lever 64, thereby securing locking lever 64 in the locked position.

Now referring to FIG. 7, an isometric view of second end 36 engaged with second handle 20, is shown. In this embodiment, locking shoulder 66 is fully engaged within the interior portion of second handle 20. Additionally, fastener cap 62 is disposed to cover fastener 22 and thereby prevent access thereto.

In operation a user may install locking bezel 30 onto face plate 14 of chassis 12 by first aligning retaining shoulder 38 with first pull handle 19 of chassis 12. Retaining shoulder 38 is then inserted into the open portion of pull handle 19. In the present embodiment, as retaining shoulder 38 is inserted into pull handle 19 fastener cap 40 is disposed to preferably lower fastener 21. During this step of the installation of locking bezel 30, locking bezel may be held vertically and at an angle with respect to first end 17 of face plate 14 such that first end 33 of locking bezel 30 is aligned with first pull handle 19, and second end 34 is positioned outward of the second end 18 of face plate 14. After retaining shoulder 38 is engaged with first pull handle 19, second end 34 of locking bezel 30 is preferably pushed toward second end 18 of face plate 14. The user then preferably aligns locking shoulder assembly 60 with second pull handle 20. In the present embodiment aligning locking shoulder 66 with second pull handle 20 is aided by alignment tabs 70 that act to direct second pull handle 20 towards locking shoulder 66. As the user pushes second end 34 of locking bezel 30 towards the second pull handle 20, second pull handle 20 preferably contacts the angled or ramped surface of locking shoulder 66. The contact of second pull handle 20 with ramped locking shoulder 66 causes locking lever 64 to be encouraged in the direction of arrow 84. During this step keyed lock assembly 44 is in the second position 80 such that locking lever 64 may freely move between the lock position and the release position. The contact of second pull handle 20 with locking shoulder 66 causes locking shoulder 66 to move into the release position thereby allowing second end 34 of locking bezel 30 to be depressed fully against second pull handle 20. As locking shoulder 66 engages the interior portion of second pull handle 20 locking shoulder 66 automatically moves to the locked position, caused by the bias of locking lever 64, thereby securing second end 34 of locking bezel 30 to face plate 14 of chassis 12. In the present embodiment, as retaining shoulder 36 is engaged with pull handle 20, fastener cap 62 is disposed to preferably cover fastener 22 in order to restrict access thereto.

A user may then preferably turn keyed lock assembly 44 into the first or locked position 82 thereby rotating locking pawl 90 to the locked position. In locked position 80, locking pawl 90 is positioned adjacent to strike pad 92 thereby preventing lock lever 64 from being moved into the release position 80. Preventing lock lever 64 from being moved into the release position 80 in turn prevents removal of locking bezel 30 installed on face plate 14 of chassis 12.

In order to remove locking bezel 30, a user preferably turns keyed lock assembly 44 to the second position 80. A user then depresses release button 68 in the direction of arrow 84 to move locking lever 64 into the release position. The user then pivots second end 34 of locking bezel 30 away from second end 18 of face plate 14, thereby swinging the locking bezel 30 away from second end 18 of face plate 14. Retaining shoulder 38 of first end 33 may then be removed from first pull handle 19.

Although the disclosed embodiments have been described in detail, it should be understood that various changes, substitutions and alterations can be made to the embodiments without departing from their spirit and scope.

What is claimed is:

1. An information handling system comprising:
   a chassis sized for housing a modular information handling system operable to associate with a plurality of modular components, the chassis having a front face forming at least one front opening;
   the front face having a first pull handle extending from a first end of the front face and a second pull handle extending from a second end of the front face, the first pull handle and the second pull handle each having an open portion; and
   a locking bezel comprising a bezel body having a first end and a second end, the first end having a retaining shoulder formed to interface with the open portion of the first pull handle to retain the first end adjacent to the front face and the second end having a locking shoulder assembly having a locking shoulder formed to interface with the open portion of the second pull handle to selectively lock the locking bezel to the front face, the locking shoulder having a ramped profile such that during installation of the locking bezel, the interaction of the ramped profile with the second pull handle encourages the locking lever into the release position to allow the locking shoulder to engage the second pull handle.

2. The information handling system of claim 1 further comprising:
   the front face having at least one fastener disposed thereon for securing the chassis to a rack; and
   the locking bezel having at least one fastener cap formed thereon operable to prevent access to the at least one fastener.

3. The information handling system of claim 2 wherein the at least one fastener comprises at least one thumb screw.

4. The information handling system of claim 1 wherein the first pull handle and the second pull handle further comprise a first D-shaped pull handle and a second D-shaped pull handle.

5. The information handling system of claim 1 wherein the locking shoulder assembly further comprises:
   a locking shoulder disposed on a locking lever,
   the locking lever movable between a lock position and a release position;
   the locking shoulder formed to interface with the second pull handle to secure the locking bezel to the front face when the locking lever is in the lock position; and
   the locking lever release position operable to disengage the locking shoulder from the second pull handle to remove the locking bezel from the front face.

6. The information handling system of claim 5, wherein the locking shoulder assembly further comprises a release button formed on the locking lever, the release button operable to move the locking lever to the release position when depressed.

7. The information handling system of claim 5 further comprising a keyed lock assembly selectively movable between a first position and a second position, the first position operable to lock the locking shoulder assembly in the lock position, the second position operable to allow the locking shoulder assembly to move between the lock position and the release position.

8. The information handling system of claim 5 wherein the locking lever further comprises a longitudinal spring biased to the lock position.

9. The information handling system of claim 1 further comprising a blade server housed in the chassis, the blade server having a plurality of blades operable to be installed or removed through the at least one front opening.

10. The information handling system of claim 1 wherein the front face further comprises a removable face plate having at least one opening sized for disposing modular components within the chassis.

11. The information handling system of claim 10 further comprising the face plate having at least one system status indicator disposed thereon.

12. A locking bezel for a modular information handling system comprising:
   a bezel body having a first end and a second end, the first end having a retaining shoulder formed to interface with an open portion of a first pull handle of a chassis to retain the first end adjacent to the front face of the chassis;
   the bezel body further comprising a locking shoulder assembly formed on the second end, the locking shoulder assembly comprising a locking shoulder disposed on a locking lever, the locking lever movable between a lock position and a release position;
   the locking shoulder assembly formed to selectively secure the locking shoulder to an open portion of a second pull handle; and
   the locking shoulder having a ramped profile such that the locking shoulder assembly automatically moves to the release position when the locking bezel is aligned with and pushed into the second pull handle, thereby allowing the locking shoulder to engage the open portion of the second pull handle.

13. The locking bezel of claim 12 wherein the first end comprises a first end cap secured to a first side of the bezel body and the second end comprises a second end cap secured to a second side of the bezel body.

14. The locking bezel of claim 12 further comprising a release tab formed on the locking lever, the release tab operable to urge the locking lever to the release position.

15. A method of securing a bezel to a modular information handling system comprising
providing a locking bezel having a bezel body with a first end and a second end, the first end including a retaining shoulder and the second end including a locking shoulder assembly;
aligning the retaining shoulder with an open portion of a first pull handle of a chassis front face;
inserting the retaining shoulder into the open portion of the first pull handle to retain the first end adjacent to the chassis front face;
positioning the locking shoulder assembly in a release position, the locking shoulder having a ramped profile;
aligning the locking shoulder assembly with an open portion of the second pull handle;
inserting a locking shoulder into the second pull handle such that the ramped profile of the locking shoulder assembly automatically moves the locking shoulder to the release position, thereby allowing the locking shoulder to advance into the open portion of the second pull handle; and
positioning the locking shoulder assembly within the open portion of the second pull handle in a lock position.

16. The method of claim 15 further comprising:
positioning a key lock assembly associated with the locking shoulder assembly to a first position operable to prevent the locking shoulder assembly from being positioned in the release position.

17. The method of claim 15 further comprising:
depressing a release tab formed on the locking shoulder assembly to position the locking shoulder assembly in the release position;
removing the locking shoulder from the second pull handle; and
removing the retaining shoulder from the first pull handle.

* * * * *